(12) United States Patent
Brandstetter

(10) Patent No.: US 10,284,630 B2
(45) Date of Patent: May 7, 2019

(54) COMPUTER-IMPLEMENTED SYSTEMS AND METHODS FOR PROVIDING CONTENT BASED ON A USER-CONTROLLABLE ADVENTUROUSNESS PARAMETER

(71) Applicant: Jeffrey D. Brandstetter, San Francisco, CA (US)

(72) Inventor: Jeffrey D. Brandstetter, San Francisco, CA (US)

( * ) Notice: Subject to any disclaimer, the term of this patent is extended or adjusted under 35 U.S.C. 154(b) by 610 days.

(21) Appl. No.: 14/677,040

(22) Filed: Apr. 2, 2015

(65) Prior Publication Data

US 2016/0294924 A1 Oct. 6, 2016

(51) Int. Cl.
*H04L 29/08* (2006.01)
*H04L 29/06* (2006.01)

(52) U.S. Cl.
CPC ............ *H04L 67/10* (2013.01); *H04L 67/306* (2013.01)

(58) Field of Classification Search
CPC ........ H04L 67/306; H04L 67/10; H04L 65/60
See application file for complete search history.

(56) References Cited

U.S. PATENT DOCUMENTS

| | | | | |
|---|---|---|---|---|
| 2008/0168390 A1* | 7/2008 | Benyamin | ......... | G06F 17/30743 715/810 |
| 2013/0031162 A1* | 1/2013 | Willis | ................ | H04L 65/1069 709/203 |
| 2013/0103535 A1* | 4/2013 | Slaney | ............... | G06Q 30/0201 705/26.7 |
| 2014/0074846 A1* | 3/2014 | Moss | ................ | G06F 17/30761 707/740 |
| 2014/0279817 A1* | 9/2014 | Whitman | .......... | G06F 17/30035 706/52 |
| 2015/0032814 A1* | 1/2015 | Broustas | ................. | H04L 67/22 709/204 |
| 2015/0242750 A1* | 8/2015 | Anderson | .......... | G06Q 30/0631 706/50 |
| 2016/0196345 A1* | 7/2016 | Kreifeldt | .......... | G06F 17/30601 707/738 |

* cited by examiner

*Primary Examiner* — Shean Tokuta
*Assistant Examiner* — Juan C Turriate Gastulo
(74) *Attorney, Agent, or Firm* — Jones Day

(57) ABSTRACT

Systems and methods are provided for providing content to a user based on a user-controllable adventurousness parameter. A content pool is accessed, where the content pool contains a plurality of content items, and where each content item is associated with a content parameter. A baseline position is identified, where the baseline position is associated with a particular value of the content parameter. A user-controllable adventurousness parameter is received, where the adventurousness parameter indicates a user preference for a next content item relative to the baseline position. The next content item is selected based on the baseline position and the adventurousness parameter, and the next content item is provided via a computer network.

18 Claims, 11 Drawing Sheets

COMPUTER-IMPLEMENTED SYSTEMS AND METHODS FOR PROVIDING CONTENT BASED ON A USER-CONTROLLABLE ADVENTUROUSNESS PARAMETER

TECHNICAL FIELD

This document relates generally to content distribution and more particularly to providing content to a user based on a user-controllable preference parameter.

BACKGROUND

As Internet bandwidth capabilities increase, on-demand content providing (e.g., video, audio, image content) continues to grow in popularity. A platform's ability to entice users to adopt and continue to use that platform's content providing capabilities is largely based on the platform's ability to consistently provide users with content that matches their tastes. This becomes especially challenging when users' tastes can vary from day to day and even minute to minute, such as based on changing mood, time of day, or other stimulus.

SUMMARY

In accordance with the teachings herein, systems and methods are provided for providing content to a user based on a user-controllable adventurousness parameter. A content pool is accessed, where the content pool contains a plurality of content items, and where each content item is associated with a content parameter. A baseline position is identified, where the baseline position is associated with a particular value of the content parameter. A user-controllable adventurousness parameter is received, where the adventurousness parameter indicates a user preference for a next content item relative to the baseline position. The next content item is selected based on the baseline position and the adventurousness parameter, and the next content item is provided via a computer network.

As another example, a system for providing content to a user based on a user-controllable adventurousness parameter includes one or more data processors and a computer-readable medium encoded with instructions for commanding the one or more data processors to execute steps. In the steps, a content pool is accessed, where the content pool contains a plurality of content items, and where each content item is associated with a content parameter. A baseline position is identified, where the baseline position is associated with a particular value of the content parameter. A user-controllable adventurousness parameter is received, where the adventurousness parameter indicates a user preference for a next content item relative to the baseline position. The next content item is selected based on the baseline position and the adventurousness parameter, and the next content item is provided via a computer network.

As a further example, a computer-readable medium is encoded with instructions for commanding one or more data processors to execute a method of providing content to a user based on a user-controllable adventurousness parameter. In the method, a content pool is accessed, where the content pool contains a plurality of content items, and where each content item is associated with a content parameter. A baseline position is identified, where the baseline position is associated with a particular value of the content parameter. A user-controllable adventurousness parameter is received, where the adventurousness parameter indicates a user preference for a next content item relative to the baseline position. The next content item is selected based on the baseline position and the adventurousness parameter, and the next content item is provided via a computer network.

DETAILED DESCRIPTION

Figure 1:
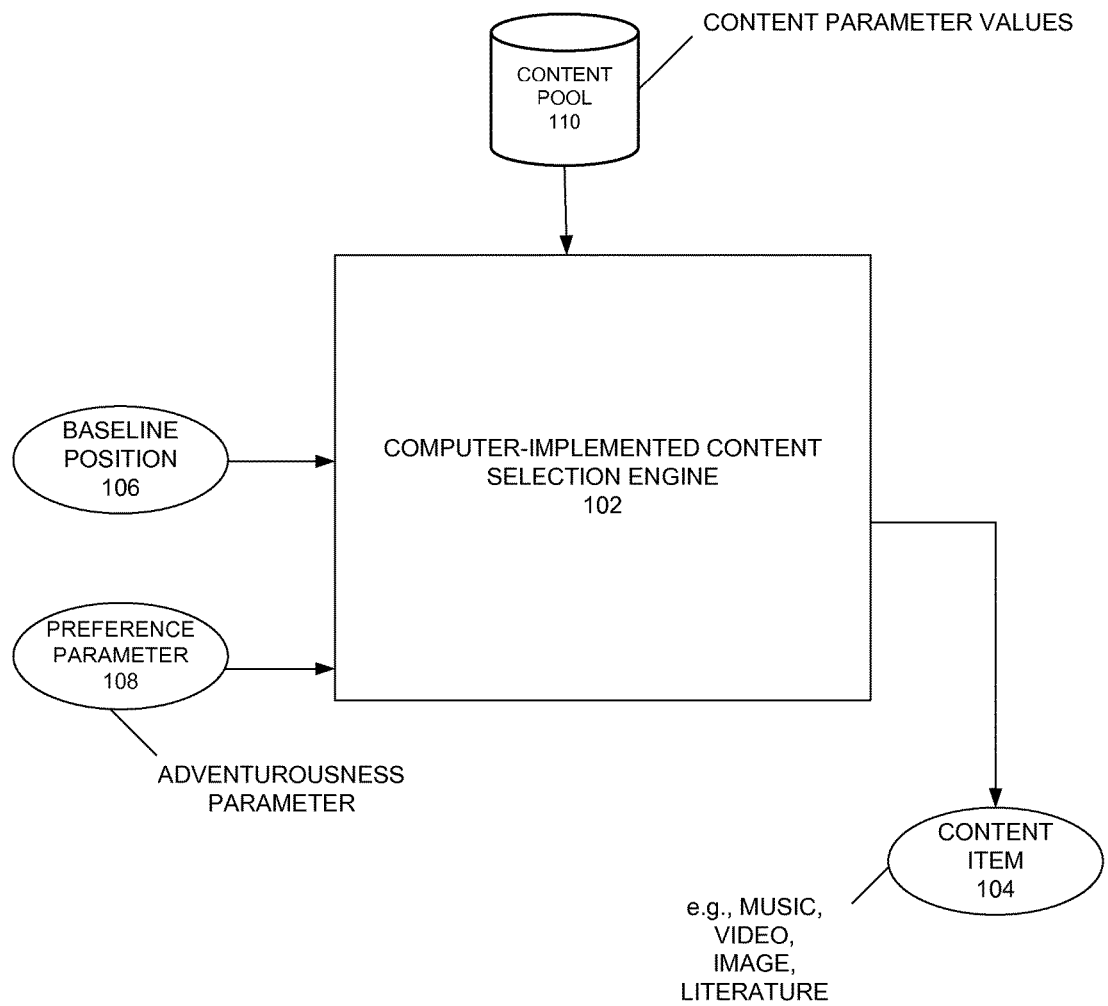
FIG. 1 is a block diagram depicting a computer-implemented content selection engine.

FIG. 1 is a block diagram depicting a computer-implemented content selection engine. A content selection engine 102 is configured to provide content items 104, such as music, video, images, or literature, to a user based on a baseline position 106 and a user entered preference parameter 108 (e.g., an adventurousness parameter). The baseline position 106, in one embodiment, is a position on a spectrum of one or more content metrics. The spectrum may be one dimensional or multi-dimensional, as described further herein. The baseline position 106 may be based on user preference. That user preference can be directly entered by the user via a user interface (e.g., the user enters a preferred genre and time period for music), may be derived from user indications of preference (e.g., the user's preferred literary type (fiction, non-fiction), time period (new, classics), and subject are derived from the last n books that the user has "Liked" or otherwise indicated a preference), or may be based on a current content item (e.g., the video type (sitcom, documentary, reality), language, and time period of a current or last video provided to the user).

The preference parameter 108 indicates a user's current preference relative to the baseline position 106. In one embodiment, the preference parameter 108 can be adjusted in real time such that the content selection engine 102 selects a next content item 104 to be provided to the user according to a current setting of the preference parameter 108. In one example, the preference parameter 108 is an adventurousness parameter. The adventurousness parameter indicates the user's preference for a next content item 104 to deviate from the baseline position. Where the baseline parameter 106 indicates adult-contemporary music from the 1980s, an adventurousness parameter 108 value indicating a high degree of adventurousness might result in a 2000s heavy metal song being outputted as a next content item 104. In contrast, when the adventurousness parameter 108 indicates a low degree of adventurousness, the next content item 104 output may be very near the baseline position 106, such as an adult-contemporary 1980s song.

The computer-implemented content selection engine 102 interacts with a content pool 110 to select a next content item 104 to be provided to a user, such as via a computer network or a wireless network. The content selection engine 102 takes the baseline position 106 and the adventurousness parameter 108 into account in selecting a next content item 104 to be provided. For example, when the user enters a low-level adventurousness parameter 108, the content selection engine 102 may select a song near the baseline position 106 (e.g., randomly from a collection of songs less than a threshold distance from the baseline position 106) to be accessed from the content pool 110 and output at 104. Positions of content in the content pool on the spectrum are determined using metadata stored in the content pool 110 as content parameter values. Content parameter values may include a date, a genre, a creator, a sex of a performer, or a content type (e.g., fiction, non-fiction).

Figure 2:
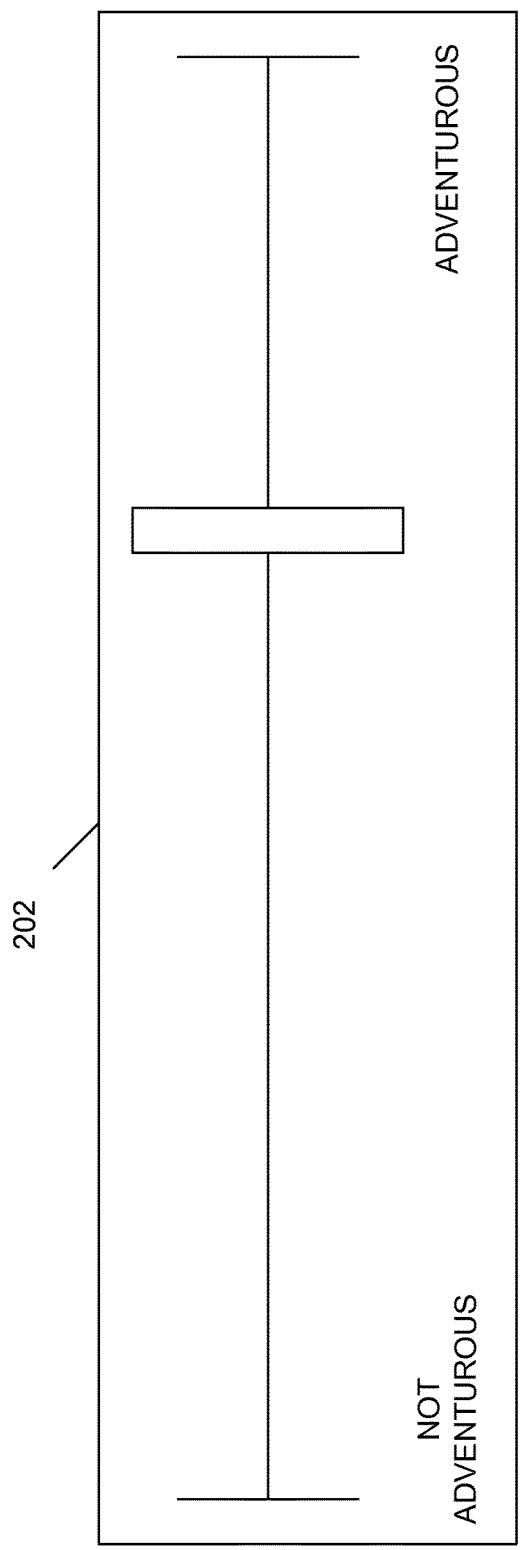
FIG. 2 is a diagram depicting an example interface for entering an adventurousness parameter.

FIG. 2 is a diagram depicting an example interface for entering an adventurousness parameter. The user interface 202 takes the form of a slide bar that ranges from not adventurous on the left hand side of the slide bar to adventurous on the right hand side of the slide bar. The user interface 202 can be provided via a graphical user interface, such as for interaction via a mouse, a keyboard, or a touch screen. In another embodiment, the user interface is presented as a physical slide bar (e.g., a physical control on a radio) that enables mechanical hand manipulation and translation of position into a value that can be used by a content selection engine. In the example of FIG. 2, the adventurousness parameter is selectable from a range of values (e.g., from 0.0-1.0; 0-10; 0-100; 0-1000) ranging from an indication of not adventurous to an indication of adventurous. In another example, the user interface may allow a two value Boolean (e.g., 0-1) selection, where 0 indicates not adventurous, and 1 represents adventurous. The content selection engine is configured to select a next content item to be provided to a user based on a baseline position and the adventurousness parameter value inputted by the user, such as via user interface 202.

Figure 3:
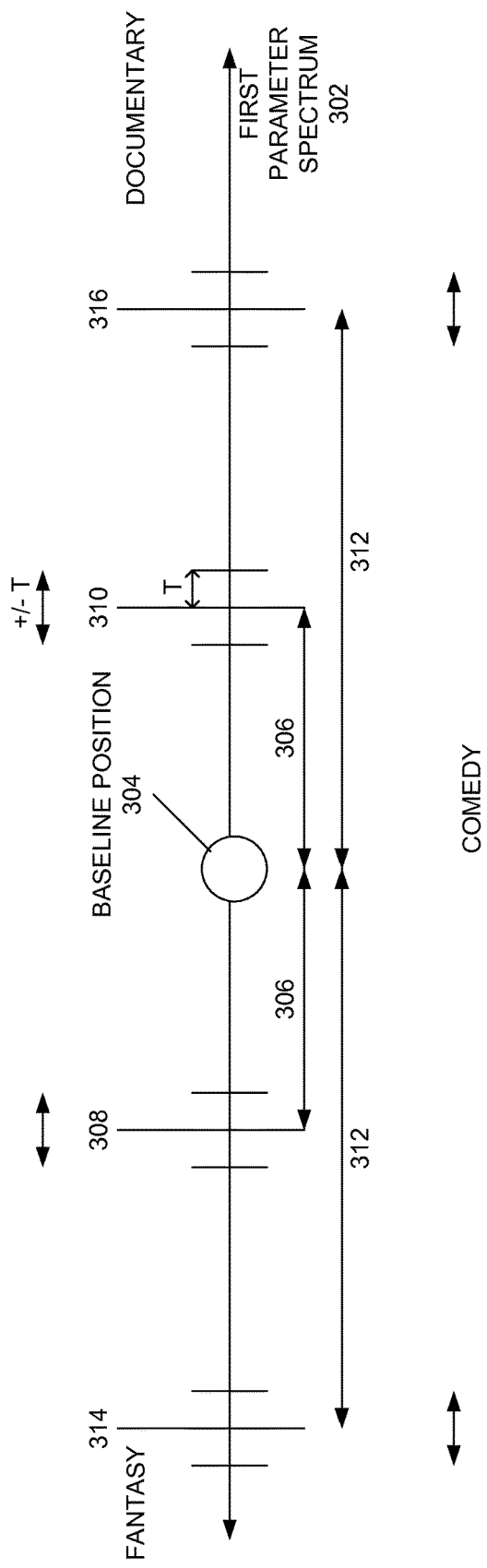
FIG. 3 is a diagram depicting an example content spectrum associated with content items in a pool of content items.

FIG. 3 is a diagram depicting an example content spectrum associated with content items in a pool of content items. FIG. 3 depicts a one dimensional spectrum 302 that is based on a first parameter. In an example, the first parameter is a video genre parameter. In that example, the spectrum ranges from fantasy at the left end of the spectrum to documentary on the right end of the spectrum. Different genres along the spectrum may be assigned different numerical values (e.g., fantasy=0; adventure=20; horror=40; comedy=60; reality=80; documentary=100). These values can be used to determine distances from a baseline position 304. In the example of FIG. 3, the user has indicated a preference near the midpoint of the first parameter spectrum 302 for the baseline position 304. A next content item provided to the user is based on that baseline position 304 and a value entered by the user for the adventurousness parameter, such as via the interface of FIG. 2.

In one embodiment, the next content item provided to the user is based on the adventurousness parameter value and distances of content items in the content pool from the baseline position 304. For example, a first distance 306 is determined based on an adventurousness parameter value that indicates a moderate level of adventurousness. That value indicates that the user wishes to deviate somewhat from the baseline position 304 but not too much. For example, the first distance 306 could be based on an adventurousness level of 0.4 on a scale of 0 (not adventurous) to 1 (adventurous). Based on that adventurousness parameter setting, the content selection engine is configured to select a next content item having a first parameter (i.e., genre) that differs from the baseline position value 304 by exactly or about the determined distance 306. Thus, the content selection engine will select a next content near one of points 308, 310, such as within a threshold distance (T) from the points 308, 310 that are the first distance 306 from the baseline position 304. In one embodiment, the content selection engine randomly selects a content item from the pool of content item that has a genre parameter that falls within +/− the threshold distance (T) from the first distance 306 points 308, 310.

Should the user turn the adventurousness parameter up to a higher value (e.g., 0.9), content that is further from the baseline position 304 will be selected as a next content item for the user. In the example of FIG. 3, an adventurousness parameter of 0.9 corresponds to distance 312. Based on that high adventurousness parameter value, the content selection engine will select a next content item near one of points 314, 316, such as within +/− T from those points 314, 316. In the example of FIG. 3, this will result in the user being provided a next content item that is near-fantasy or near-documentary, which is far from its baseline position that is closest to the comedy genre. In one embodiment, the spectrum wraps at its ends, such that traversing to the right beyond the documentary genre re-enters the spectrum at the fantasy point on the left of the spectrum.

Figure 4:
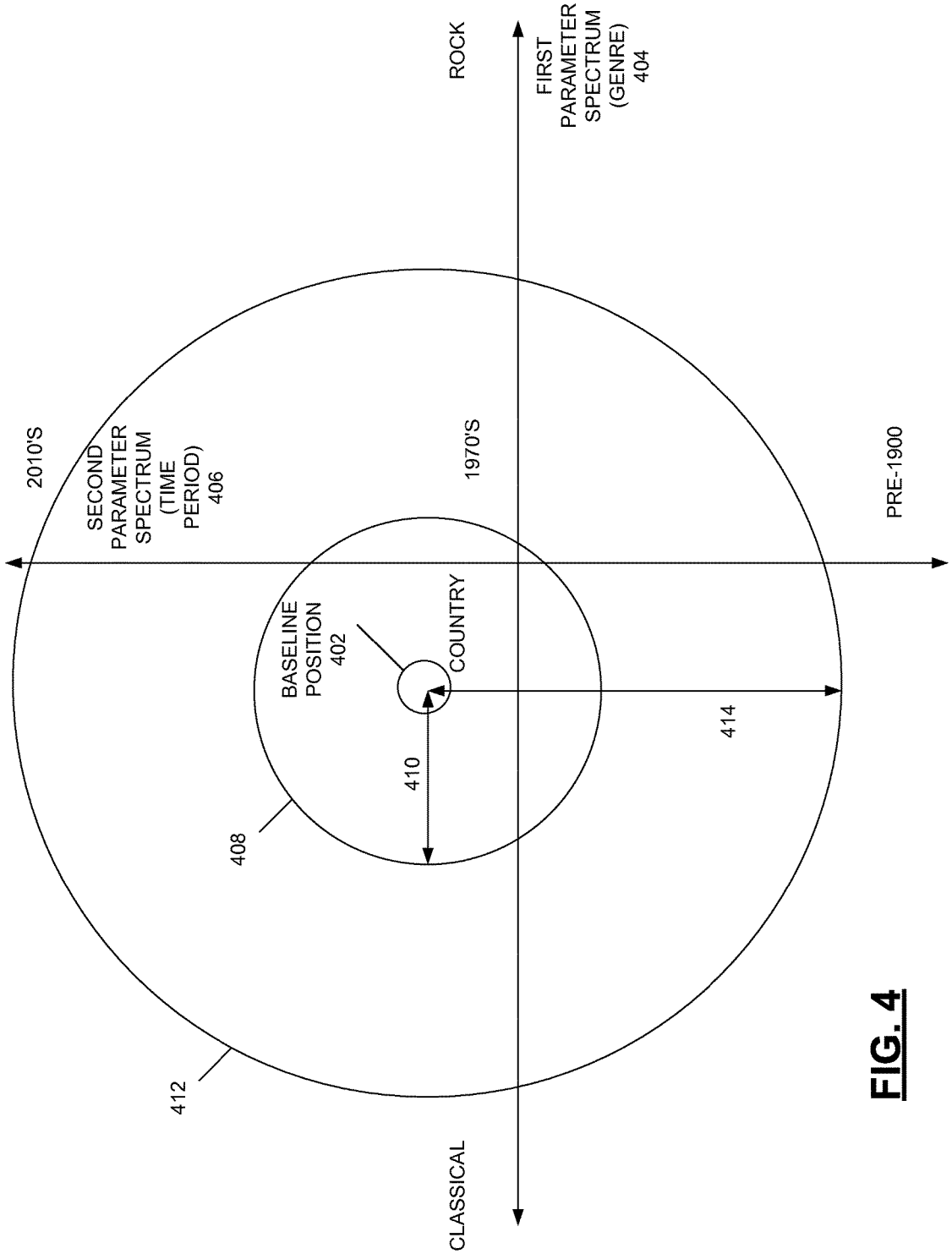
FIG. 4 is a block diagram depicting selection of content by a content selection engine using a two dimensional spectrum.

FIG. 4 is a diagram depicting selection of content by a content selection engine using a two dimensional spectrum. A baseline position 402 is positioned in an upper left quadrant of a spectrum that includes a genre first parameter spectrum 404 running horizontally and a time period second parameter spectrum 406 running vertically. In the example of FIG. 4, the baseline position 402 is positioned near the 1980s time period and the country music genre. In this example, the baseline position 402 corresponds with a current or last content item provided to the user. Thus, the user can use the adventurousness parameter to have a next content item be similar to the current content item or much different.

A first circle 408 is depicted that is a first radius 410 difference away from the baseline position 402. That radius 410 corresponds to an adventurousness parameter value that indicates a relatively low level of user-desired adventurousness. Based on that adventurousness parameter value, a content selection engine will select a next content item for the user that sits at or near the first circle 408 on the spectrum. A second circle 412 is depicted that is a second radius 414 difference away from the baseline position 402. That radius corresponds to an adventurousness parameter value that indicates a higher level of user-desired adventurousness. Based on that adventurousness parameter value, a content selection engine will select a next content item for the user that sits at or near the second circle 412 on the spectrum.

In other embodiments, the spectrum can be three-dimensional or poly-dimensional based on additional content parameter values. Distances from a baseline position can be calculated based on Pythagorean distances along the multiple dimensions. For a three-dimensional spectrum, a particular adventurousness parameter value would be represented in a three dimensional space by a sphere having a radius that corresponds to the particular adventurousness parameter value.

Figure 5:
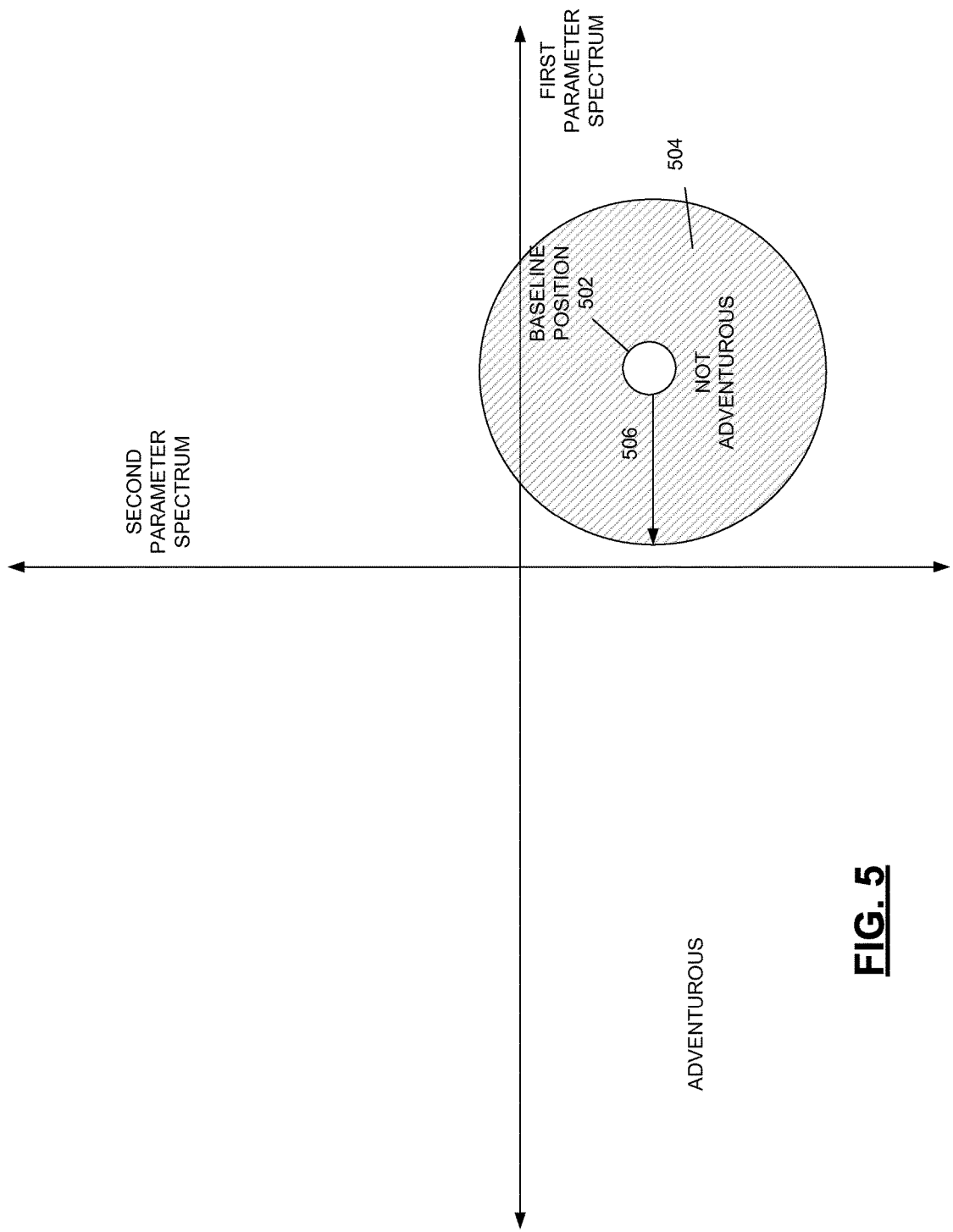
FIG. 5 is a diagram depicting a two dimensional spectrum for use with a Boolean adventurous/non-adventurous-type user preference parameter.

FIG. 5 is a diagram depicting a two dimensional spectrum for use with a Boolean adventurous/non-adventurous-type user preference parameter. A baseline position 502 sits in the lower right quadrant of a two parameter spectrum. A user inputs an adventurousness parameter that indicates either not adventurous or adventurous. If the user selects not adventurous, the content selection engine selects a next content item for the user that falls within the circle 504 having a pre-determined radius 506. If the user selects adventurous, the content selection engine selects a next content item for the user that is outside of the circle 506 in the spectrum. In one embodiment, the pool of content items is segmented based on the baseline position 502 and the circle 504 such that a first portion contains content items that fall within the circle 504 and the second portion contains content items that fall outside of the circle 506. When the adventurous parameter is set to a non-adventurous value, then the next content item is selected from the first segment. When the adventurous parameter is set to an adventurous value, then the next content item is selected from the second segment.

Figure 6:
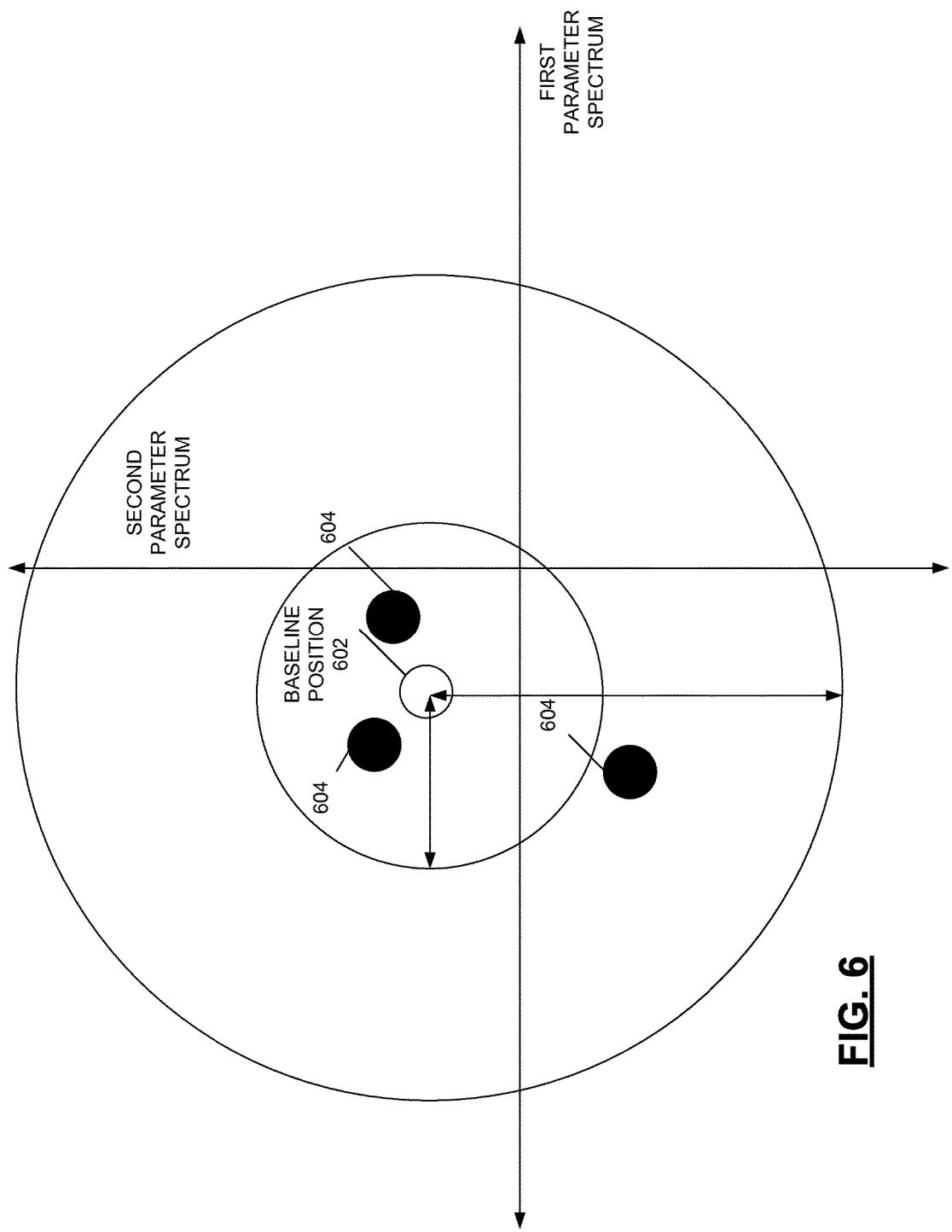
FIG. 6 is a diagram depicting a two dimensional spectrum having a baseline position set based on a center of mass of a plurality of other positions on the spectrum.

FIG. 6 is a diagram depicting a two dimensional spectrum having a baseline position set based on a center of mass of a plurality of other positions on the spectrum. In one example, the baseline position 602 is positioned on the two dimensional spectrum at an average value on the spectrum for the last n content items 604 for which the user indicated approval. For example, the baseline position 602 may be based on the spectrum positions 604 of the last three content items that the user "Liked." That baseline position 602 in other examples may be based on all content items that a user has liked, content items that the user has liked in the last x days, or the last n content items that the user has liked, where n is a pre-defined number. Next content items can then be selected based on the baseline position 602 and a user entered adventurousness parameter that adjusts a spectrum radius that dictates from where the next content item will be selected.

Figure 7:
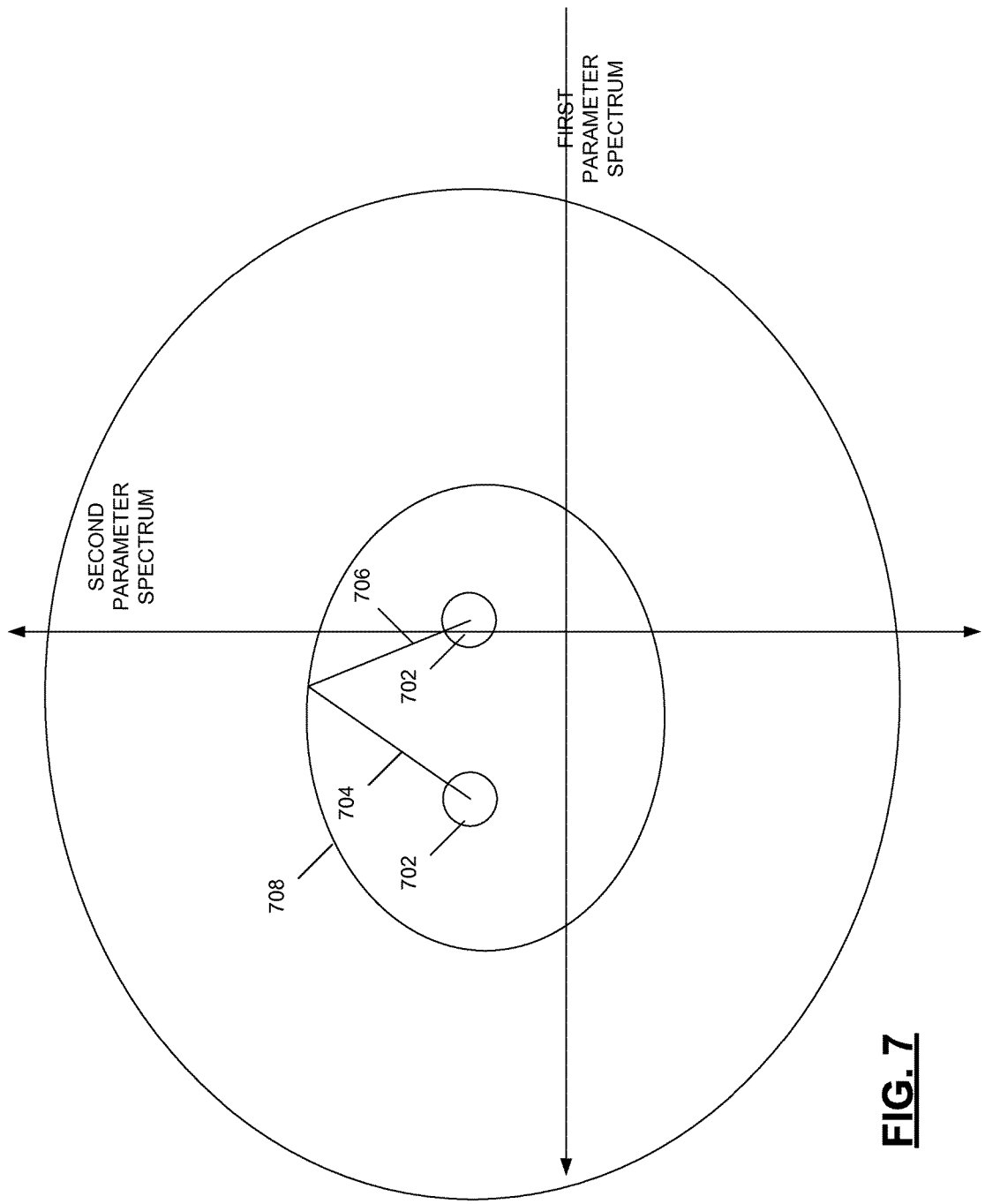
FIG. 7 is a diagram depicting a two dimensional spectrum where a next content item is selected based on one or more baseline positions.

FIG. 7 is a diagram depicting a two dimensional spectrum where a next content item is selected based on one or more baseline positions. In the example of FIG. 7, the two baseline positions 702 are indicative of the last two content items provided to the user. The user entered adventurousness parameter corresponds to a distance d, where the sum of the distances 704, 706 from any point of an ellipse (e.g., ellipse 708) is equal to the distance d (i.e., the baseline positions 702 represent foci of ellipse 708). A higher adventurousness parameter value results in a larger ellipse. In other examples, other geometric shapes can be used to define levels of adventurousness from one or more baseline positions.

Figure 8:
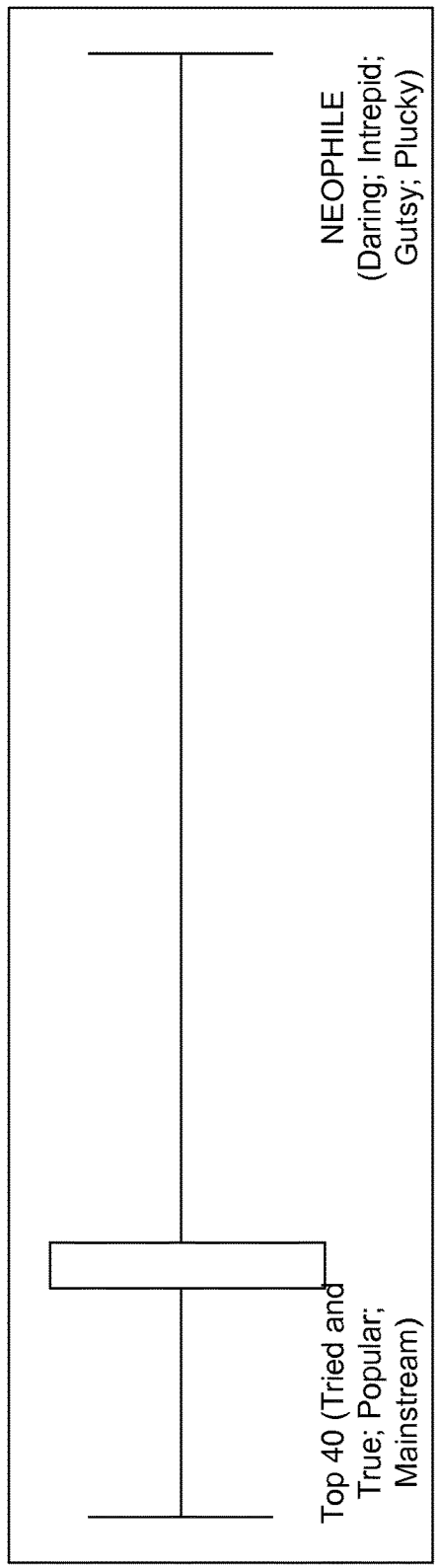
FIG. 8 is a diagram depicting an adventurous parameter selecting slide bar.

FIG. 8 is a diagram depicting an adventurous parameter selecting slide bar. In the example of FIG. 8, a baseline position is set as a mainstream setting for the general population (e.g., a top 40 position on the spectrum). By selecting near the left of the FIG. 8 spectrum, a user is provided content near that mainstream setting. The right side of the slide bar is associated with content that is adventurous for the average user. The content selection engine is configured to select a next content item based on that mainstream baseline position and the user entered adventurousness parameter value.

Figure 9:
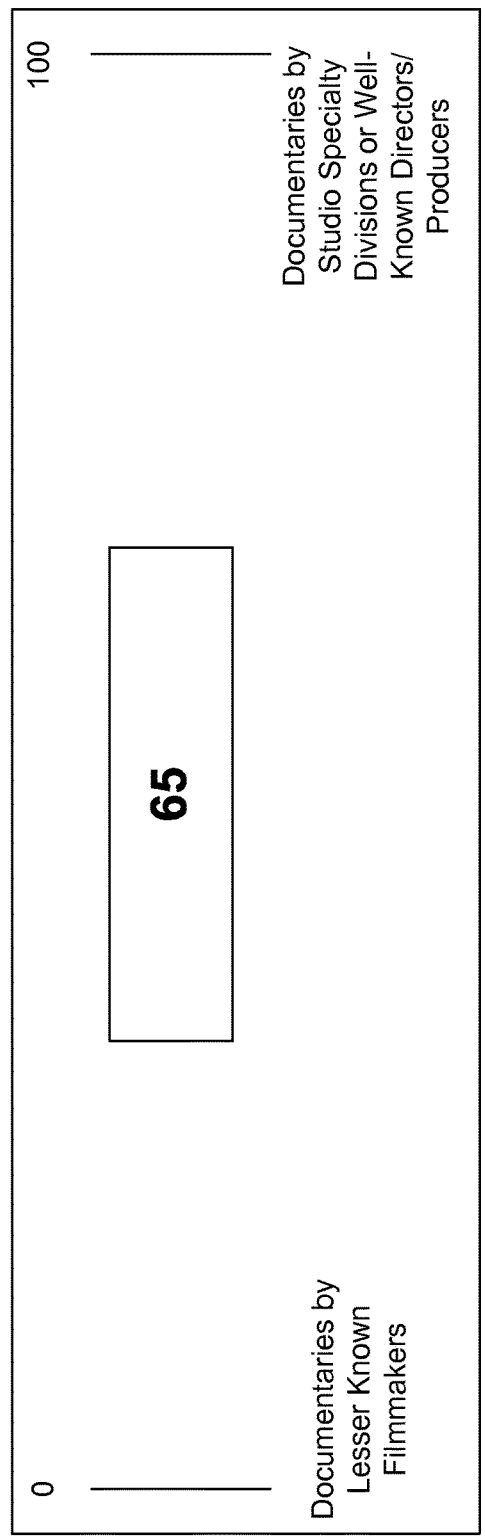
FIG. 9 is a diagram depicting another user interface for entering an adventurous parameter value, where the adventurousness parameter is entered numerically, such as via a keyboard.

FIG. 9 is a diagram depicting another user interface for entering an adventurous parameter value, where the adventurousness parameter is entered numerically, such as via a keyboard.

Figure 10A:
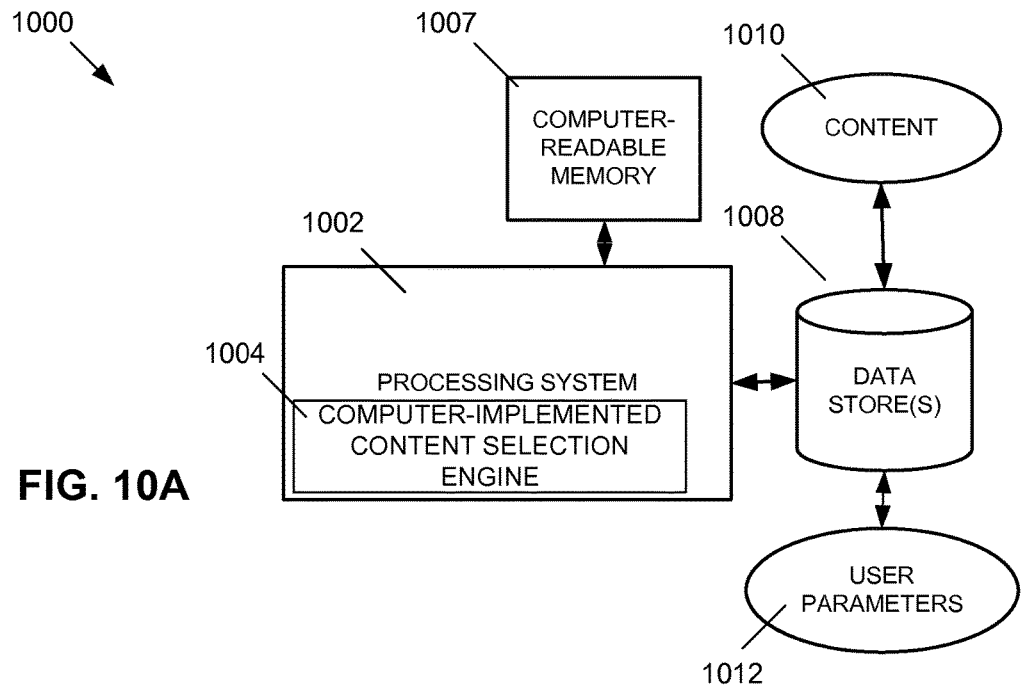
In FIGS. 10A, 10B, and 10C, computer readable memories or data stores may include one or more data structures for storing and associating various data used in the example systems for providing content to a user.
Figure 10B:
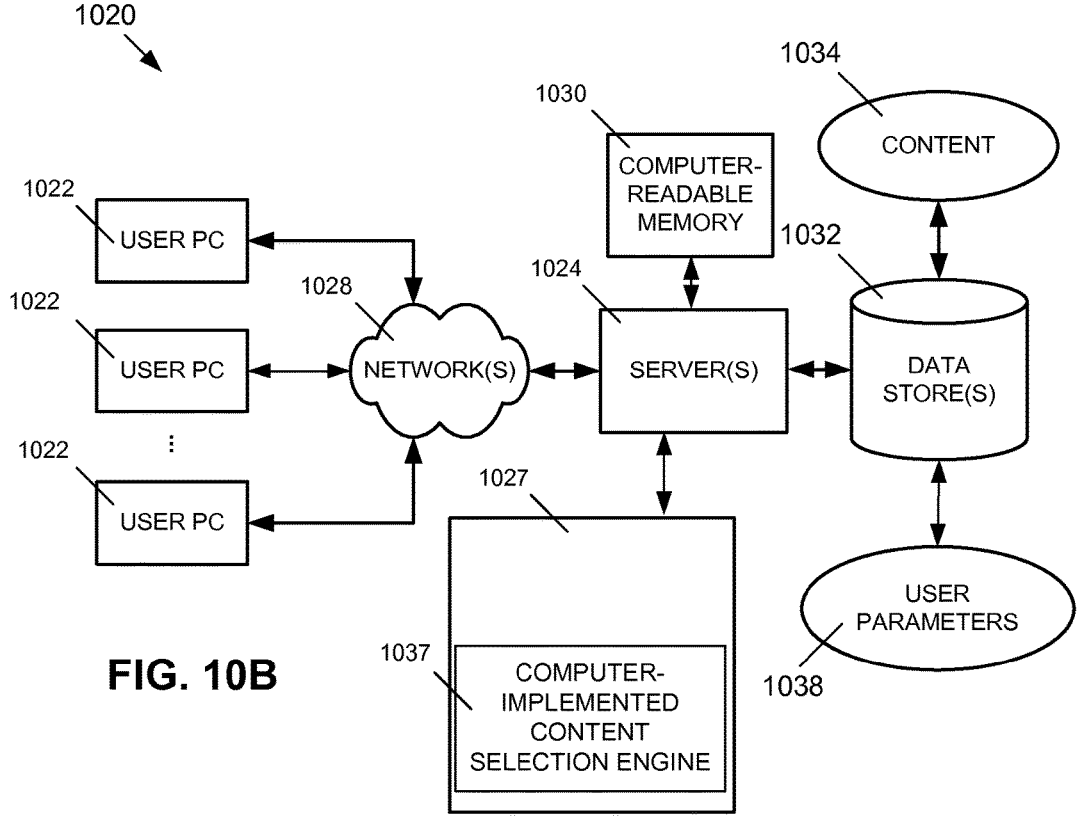
Figure 10C:
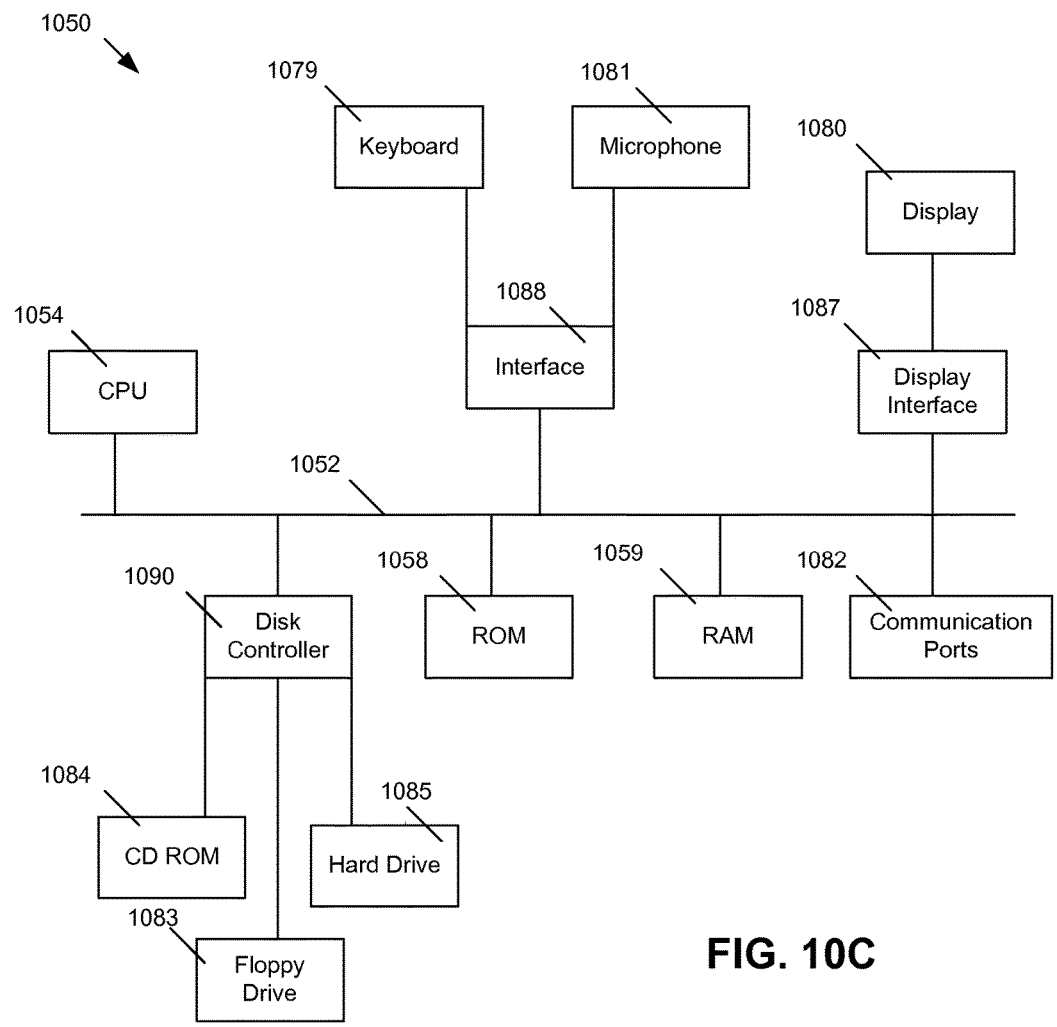

FIGS. 10A, 10B, and 10C depict example systems for implementing the approaches described herein for providing content to a user based on a user-controllable adventurousness parameter. For example, FIG. 10A depicts an exemplary system 1000 that includes a standalone computer architecture where a processing system 1002 (e.g., one or more computer processors located in a given computer or in multiple computers that may be separate and distinct from one another) includes a content selection engine 1004 being executed on the processing system 1002. The processing system 1002 has access to a computer-readable memory 1007 in addition to one or more data stores 1008. The one or more data stores 1008 may include content items 1010 as well as user entered parameters 1012. The processing system 1002 may be a distributed parallel computing environment, which may be used to handle very large-scale data sets.

FIG. 10B depicts a system 1020 that includes a client-server architecture. One or more user PCs 1022 access one or more servers 1024 running a content selection engine 1037 on a processing system 1027 via one or more networks 1028. The one or more servers 1024 may access a computer-readable memory 1030 as well as one or more data stores 1032. The one or more data stores 1032 may include content items 1034 as well as user parameters 1038.

FIG. 10C shows a block diagram of exemplary hardware for a standalone computer architecture 1050, such as the architecture depicted in FIG. 10A that may be used to include and/or implement the program instructions of system embodiments of the present disclosure. A bus 1052 may serve as the information highway interconnecting the other illustrated components of the hardware. A processing system 1054 labeled CPU (central processing unit) (e.g., one or more computer processors at a given computer or at multiple computers), may perform calculations and logic operations required to execute a program. A non-transitory processor-readable storage medium, such as read only memory (ROM) 1058 and random access memory (RAM) 1059, may be in communication with the processing system 1054 and may include one or more programming instructions for performing the method of providing content to a user based on a user-controllable adventurousness parameter. Optionally, program instructions may be stored on a non-transitory computer-readable storage medium such as a magnetic disk, optical disk, recordable memory device, flash memory, or other physical storage medium.

In FIGS. 10A, 10B, and 10C, computer readable memories 1008, 1030, 1058, 1059 or data stores 1008, 1032, 1083, 1084, 1088 may include one or more data structures for storing and associating various data used in the example systems for providing content to a user. For example, a data structure stored in any of the aforementioned locations may be used to store data from XML files, initial parameters, and/or data for other variables described herein. A disk controller 1090 interfaces one or more optional disk drives to the system bus 1052. These disk drives may be external or internal floppy disk drives such as 1083, external or internal CD-ROM, CD-R, CD-RW or DVD drives such as 1084, or external or internal hard drives 1085. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1090, the ROM 1058 and/or the RAM 1059. The processor 1054 may access one or more components as required.

A display interface 1087 may permit information from the bus 1052 to be displayed on a display 1080 in audio, graphic, or alphanumeric format. Communication with external devices may optionally occur using various communication ports 1082.

In addition to these computer-type components, the hardware may also include data input devices, such as a keyboard 1079, or other input device 1081, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. For example, while the systems and methods as described herein are described with reference to audio, text, image, and video content, the systems and methods can be expanded to provide content based on user preferences for other content such as dating (spectrums based on height, race, religion, interests) or pornography. Thus, it is intended that the present disclosure cover the modifications and variations of this disclosure provided they come within the scope of the appended claims and their equivalents.

It is claimed:

1. A computer-implemented method of transmitting content across a network to a user for playing or display based on a user-controllable adventurousness parameter, comprising:
   accessing a content pool, wherein the content pool contains a plurality of content items, wherein each content item is associated with a first content parameter and a second content parameter;
   identifying a baseline position, wherein the baseline position is associated with a particular value of the first content parameter and a particular value of the second content parameter;
   receiving a user-controllable adventurousness parameter via a user interface, wherein the adventurousness parameter indicates a user preference for a next content item relative to the baseline position;
   selecting the next content item based on the baseline position and the adventurousness parameter, wherein selecting the next content item comprises:
      determining a distance between the baseline position and each content item in the content pool by calculating a Euclidean distance based on the first content parameter of that content item, the particular value of the first content parameter of the baseline position, the second content parameter of that content item, and the particular value of the second content parameter of the baseline position;
      randomly selecting the next content item from a set of content items having a distance less than a threshold, the threshold being based on the adventurousness parameter;
      wherein the adventurousness parameter indicates more adventurous or less adventurous relative to a distance from the baseline position to the current content item;
      wherein the next content item is selected as a content item having a greater Euclidean distance than the distance from the baseline position when the adventurousness parameter indicates more adventurous; and
      wherein the next content item is selected as a content item having a lesser Euclidean distance than the distance from the baseline position when the adventurousness parameter indicates less adventurous; and
   transmitting the next content item across a computer network for playing or display, wherein the transmitted next content item is played using a speaker or displayed via a graphical user interface.

2. The method of claim 1, wherein the baseline position is based on a current or recent content item that has been provided via the computer network.

3. The method of claim 1, wherein the baseline position is based on a user preference.

4. The method of claim 3, wherein the user preference is explicitly entered by a user.

5. The method of claim 3, further comprising:
   receiving one or more indications from a user that the user approved of one or more content items; and
   computing the baseline position based on content parameters associated with the one or more content items.

6. The method of claim 1, wherein the adventurousness parameter is a Boolean, adventurous/not adventurous parameter.

7. The method of claim 1, wherein the adventurousness parameter is on a scale from not adventurous to adventurous having more than two possible values.

8. The method of claim 1, further comprising:
determining a target value based on the adventurousness parameter;
determining a distance for each of a plurality of candidate content items based on the particular value of the content parameter associated with the baseline position and content parameters for each of the plurality of candidate content items;
wherein the next content item is selected based on the distances and the target value.

9. The method of claim 8, wherein the next content item is selected based on a distance matching the target value.

10. The method of claim 8, wherein the next content item is selected based on a distance being within a threshold distance of the target value.

11. The method of claim 10, wherein the next content item is randomly selected from a set of content items within the threshold distance of the target value.

12. The method of claim 8, wherein the distance for each of the plurality of candidate content items is based on a plurality of different content parameters.

13. The method of claim 1, wherein the content parameter is a genre parameter.

14. The method of claim 1, wherein the user adventurousness indication is received via a slide bar presented to the user via a graphical user interface.

15. The method of claim 1, wherein the content is music content, video content, image content, or literature content.

16. A computer-implemented system of transmitting content across a network to a user for playing or display based on a user-controllable adventurousness parameter, comprising:
one or more data processors;
one or more computer-readable mediums encoded with instructions for commanding the one or more data processors to execute steps comprising:
accessing a content pool, wherein the content pool contains a plurality of content items,
accessing a content pool, wherein the content pool contains a plurality of content items, wherein each content item is associated with a first content parameter and a second content parameter;
identifying a baseline position, wherein the baseline position is associated with a particular value of the first content parameter and a particular value of the second content parameter;
receiving a user-controllable adventurousness parameter via a user interface, wherein the adventurousness parameter indicates a user preference for a next content item relative to the baseline position;
selecting the next content item based on the baseline position and the adventurousness parameter, wherein selecting the next content item comprises:
determining a distance between the baseline position and each content item in the content pool by calculating a Euclidean distance based on the first content parameter of that content item, the particular value of the first content parameter of the baseline position, the second content parameter of that content item, and the particular value of the second content parameter of the baseline position;
randomly selecting the next content item from a set of content items having a distance less than a threshold, the threshold being based on the adventurousness parameter;
wherein the adventurousness parameter indicates more adventurous or less adventurous relative to a distance from the baseline position to the current content item;
wherein the next content item is selected as a content item having a greater Euclidean distance than the distance from the baseline position when the adventurousness parameter indicates more adventurous; and
wherein the next content item is selected as a content item having a lesser Euclidean distance than the distance from the baseline position when the adventurousness parameter indicates less adventurous; and
transmitting the next content item across a computer network for playing or display, wherein the transmitted next content item is played using a speaker or displayed via a graphical user interface.

17. A computer-readable medium encoded with instructions for commanding one or more data processors to execute steps for transmitting content across a network to a user for playing or display based on a user-controllable adventurousness parameter, comprising:
accessing a content pool, wherein the content pool contains a plurality of content items, wherein each content item is associated with a first content parameter and a second content parameter;
identifying a baseline position, wherein the baseline position is associated with a particular value of the first content parameter and a particular value of the second content parameter;
receiving a user-controllable adventurousness parameter via a user interface, wherein the adventurousness parameter indicates a user preference for a next content item relative to the baseline position;
selecting the next content item based on the baseline position and the adventurousness parameter, wherein selecting the next content item comprises:
determining a distance between the baseline position and each content item in the content pool by calculating a Euclidean distance based on the first content parameter of that content item, the particular value of the first content parameter of the baseline position, the second content parameter of that content item, and the particular value of the second content parameter of the baseline position;
randomly selecting the next content item from a set of content items having a distance less than a threshold, the threshold being based on the adventurousness parameter;
wherein the adventurousness parameter indicates more adventurous or less adventurous relative to a distance from the baseline position to the current content item;
wherein the next content item is selected as a content item having a greater Euclidean distance than the distance from the baseline position when the adventurousness parameter indicates more adventurous; and
wherein the next content item is selected as a content item having a lesser Euclidean distance than the distance from the baseline position when the adventurousness parameter indicates less adventurous; and transmitting the next content item across a computer network for playing or display, wherein the transmitted next content item is played using a speaker or displayed via a graphical user interface.

18. A computer-implemented method of transmitting content across a network to a user for playing or display based on a user-controllable adventurousness parameter, comprising:

accessing a content pool, wherein the content pool contains a plurality of content items, wherein each content item is associated with a first content parameter and a second content parameter;

identifying a baseline position, wherein the baseline position is associated with a particular value of the first content parameter and a particular value of the second content parameter;

receiving an adventurousness parameter wherein the adventurousness parameter indicates a user preference for a next content item relative to the baseline position;

selecting the next content item based on the baseline position and the adventurousness parameter, wherein selecting the next content item comprises:

determining a distance between the baseline position and each content item in the content pool by calculating a Euclidean distance based on the first content parameter of that content item, the particular value of the first content parameter of the baseline position, the second content parameter of that content item, and the particular value of the second content parameter of the baseline position;

randomly selecting the next content item from a set of content items having a distance less than a threshold, the threshold being based on the adventurousness parameter;

wherein the adventurousness parameter indicates more adventurous or less adventurous than a position of a current content item, wherein the current content item is associated with a distance from the baseline position;

wherein the next content item is selected as a content item having a greater Euclidean distance than the current content item distance from the baseline position when the adventurousness parameter indicates more adventurous; and wherein the next content item is selected as a content item having a lesser Euclidean distance than the current content item distance from the baseline position when the adventurousness parameter indicates less adventurous; and transmitting the next content item across a computer network for playing or display, wherein the transmitted next content item is played using a speaker or displayed via a graphical user interface.

* * * * *